United States Patent
Geissenhoener et al.

(10) Patent No.: US 8,096,602 B2
(45) Date of Patent: Jan. 17, 2012

(54) ROOF ARRANGEMENT FOR A CONVERTIBLE, AND CONVERTIBLE WITH A ROOF ARRANGEMENT OF THIS TYPE

(75) Inventors: Kai Geissenhoener, Suhl (DE); Reiner Armbruster, Muehlacker (DE)

(73) Assignee: Dr. Ing H.c.F. Porsche Aktiengesellschaft (DE)

( * ) Notice: Subject to any disclaimer, the term of this patent is extended or adjusted under 35 U.S.C. 154(b) by 150 days.

(21) Appl. No.: 12/619,025

(22) Filed: Nov. 16, 2009

(65) Prior Publication Data

US 2010/0194139 A1 Aug. 5, 2010

(30) Foreign Application Priority Data

Feb. 4, 2009 (DE) .......................... 10 2009 007 331

(51) Int. Cl.
*B60J 7/12* (2006.01)
(52) U.S. Cl. ............................... 296/107.12; 296/107.09
(58) Field of Classification Search ............ 296/107.01, 296/107.09, 107.12; 280/756
See application file for complete search history.

(56) References Cited

U.S. PATENT DOCUMENTS

| 2,482,323 | A | * | 9/1949 | Cromwell et al. | ........ 296/107.12 |
| 3,075,804 | A | * | 1/1963 | Geiger et al. | ............ 296/107.12 |
| 4,991,904 | A | | 2/1991 | Zweigart | |
| 6,022,064 | A | * | 2/2000 | Robbins et al. | .......... 296/107.12 |
| 7,448,667 | B2 | * | 11/2008 | Just | ........................ 296/107.12 |
| 7,762,610 | B2 | | 7/2010 | Armbruster et al. | |
| 7,770,958 | B2 | | 8/2010 | Bunsmann | |

FOREIGN PATENT DOCUMENTS

| DE | 20 2006 012 235 | 12/2006 |
| GB | 821311 | 10/1959 |
| GB | 821311 | 11/1961 |

* cited by examiner

*Primary Examiner* — Jason S Morrow
(74) *Attorney, Agent, or Firm* — Gerald E. Hespos; Michael J. Porco

(57) ABSTRACT

A roof arrangement (17) for a convertible (1) has a flexible convertible-top cloth (19) that can be removed by hand and stretched over a passenger compartment (16) between a cowl (9) and a rear end fastening device (18). A supporting bow (26) is beneath the convertible-top cloth (19) and is arranged in the transverse direction (FQ) of the convertible (1) at a distance behind the cowl (9). A tensioning device (32) keeps the convertible-top cloth (19) tensioned in relation to the cowl (9). The tensioning device (32) braces the convertible-top cloth (19) down adjacent to the supporting bow (26) and approximately in the vertical direction of the vehicle (FH) when the roof arrangement (17) is mounted on the convertible (1).

11 Claims, 2 Drawing Sheets

ROOF ARRANGEMENT FOR A CONVERTIBLE, AND CONVERTIBLE WITH A ROOF ARRANGEMENT OF THIS TYPE

CROSS-REFERENCE TO RELATED APPLICATIONS

This application claims priority under 35 USC 119 to German Patent Application No. 10 2009 007 331.0 filed on Feb. 4, 2009, the entire disclosure of which is incorporated herein by reference.

BACKGROUND OF THE INVENTION

1. Field in the Invention

The invention relates to a roof arrangement for a convertible and to a convertible with a roof arrangement.

2. Description of the Related Art

DE 20 2006 012 235 U1 discloses a roof arrangement with a flexible convertible-top cloth that can be removed from the convertible by hand and can be stretched over a passenger compartment between a cowl and a rear end fastening device formed on a rear lid. The convertible-top cloth has strip-shaped ends that extend to the rear and can be connected to the fastening device on the rear lid. The roof arrangement of the convertible includes two supporting bows that run in the transverse direction of the convertible at a distance behind the cowl and the convertible-top cloth is placed over the supporting bows. The two supporting bows are vertically displaceable on the convertible manner so that the convertible-top cloth can be tensioned in the longitudinal direction of the vehicle, which also is referred to as the Y direction. The convertible-top cloth merely is placed loosely over the supporting bows so that the convertible-top cloth is relaxed in the Y direction when the tailgate is opened and is tensioned only when the tailgate is closed. The adjustment of the fabric tension over the vertically displaceable vertically displaceable supporting bows is therefore difficult.

It is therefore an object of the invention to provide a roof arrangement having an improved tensioning device for the convertible-top cloth.

SUMMARY OF THE INVENTION

The invention relates to a tensioning device with a tensioning means for bracing the convertible-top cloth adjacent to the supporting bow down and in a manner so that it runs approximately in the vertical direction of the vehicle when the roof arrangement is mounted on the convertible. The tension in the convertible-top cloth therefore is introduced into the convertible-top cloth independently of the rear fastening device. Additionally, the tensioning device can be actuated to build up the fabric tension when the rear lid is closed. The convertible-top cloth is deflected on the supporting bow and braced downward due to the fact that the convertible-top cloth is braced down in the vertical direction of the vehicle. Thus high tensioning forces can be built up. Fluttering or vibration of the convertible-top cloth is reduced greatly while the convertible is under way.

The tensioning device preferably is located behind the supporting bow, but in front of the rear fastening device. Thus, the tensioning device can optimally tension the section of the convertible-top cloth located over the passenger compartment, while the section of the convertible-top cloth between the tensioning device and the rear fastening device can be configured as a design element.

The tensioning device preferably has a flexible tensioning means that can be connected to the convertible-top cloth and can be fastened at the ends thereof to the convertible. Thus, the ends of the tensioning means preferably are assigned respectively to to the sides of the vehicle while the tensioning means is connected over a substantial section to the convertible-top cloth. Tension therefore can be built up in the longitudinal direction of the vehicle over virtually the entire width of the convertible-top cloth.

The tensioning means preferably has a force accumulator, such as a spring or the like, as a compensating element.

The tensioning device preferably has a pulling and locking element for the tensioning means. Pulling and locking elements of this type can be, for example, tensioning levers, ratchets or similar elements that can introduce a pulling force into a flexible tensioning means to permit the convertible-top cloth to be braced down and oriented in the vertical direction of the vehicle.

The tensioning means may be a tensioning cable. The tensioning cable can be connected in a simple manner to the convertible-top cloth, and can be guided in a pocket or stitched to the convertible-top cloth. The tensioning cable simply can be folded up for storage of the roof arrangement that has been removed from the convertible.

The invention also relates to convertible provided with a roof arrangement as described above.

In addition to the roof arrangement, the convertible also preferably has a fixed roll bar to which the supporting bow can be fastened. The fixed roll bar therefore provides an abutment for the supporting bow when the convertible-top cloth is tensioned around the supporting bow. Stringent requirements regarding the strength of the supporting bow do not have to be fulfilled since the supporting bow can be supported on the roll bar. The absorption of force by the bracing of the convertible-top cloth takes place substantially in the roll bar. Consequently, the compactly constructed supporting bow and the flexible convertible-top cloth can be packed up small and put away in the motor vehicle.

The ends of the tensioning means preferably are fixed to the roll bar. Therefore, forces are not introduced into the bodywork itself by the tensioning device but rather are absorbed in the roll bar. In addition, no fastening points for the tensioning device have to be provided on the bodywork. A preassembled roll bar therefore can already have the devices necessary for the tensioning device.

DETAILED DESCRIPTION OF THE PREFERRED EMBODIMENT

Figure 1:
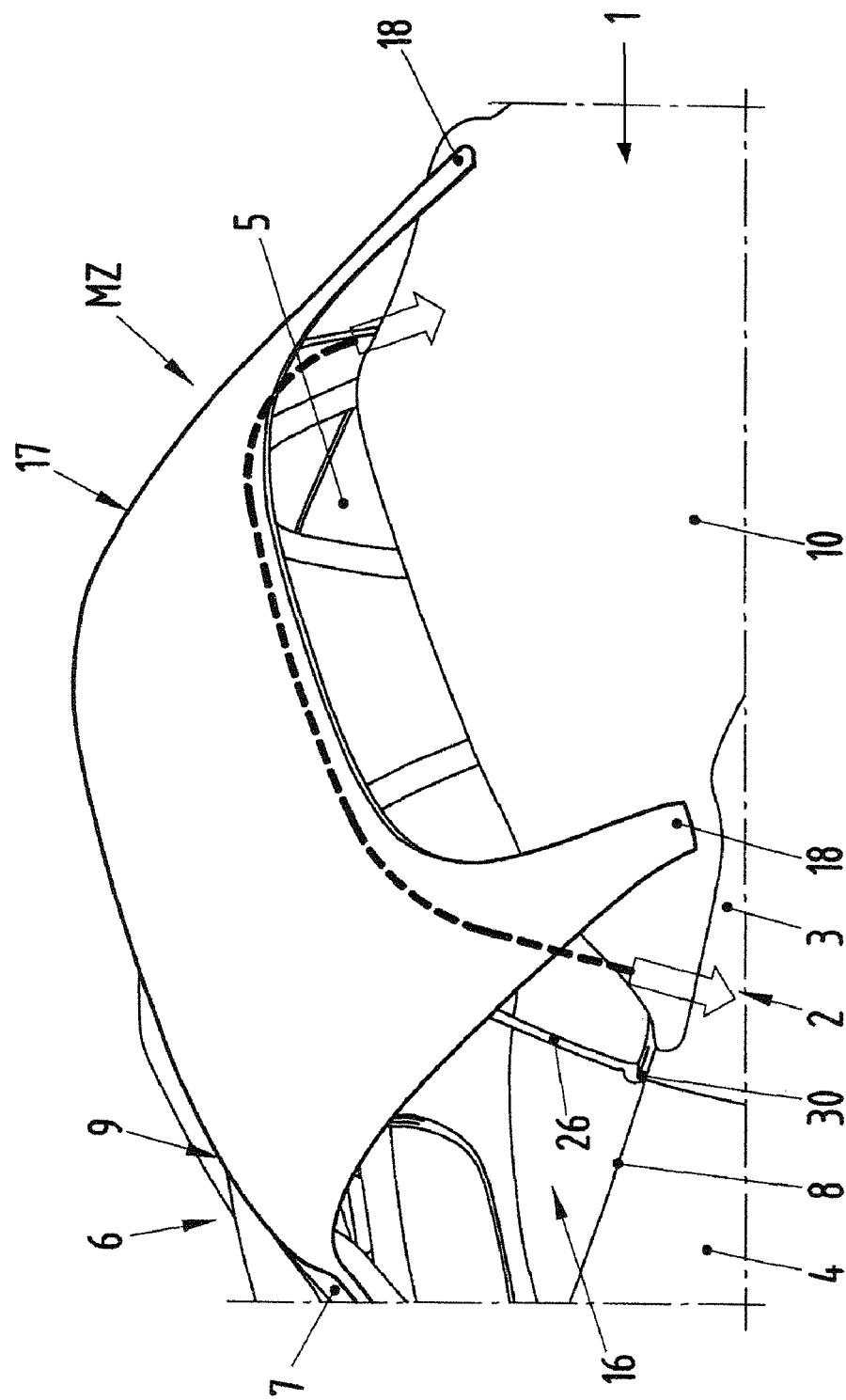
FIG. 1 shows part of a convertible with a roof arrangement.
Figure 2:
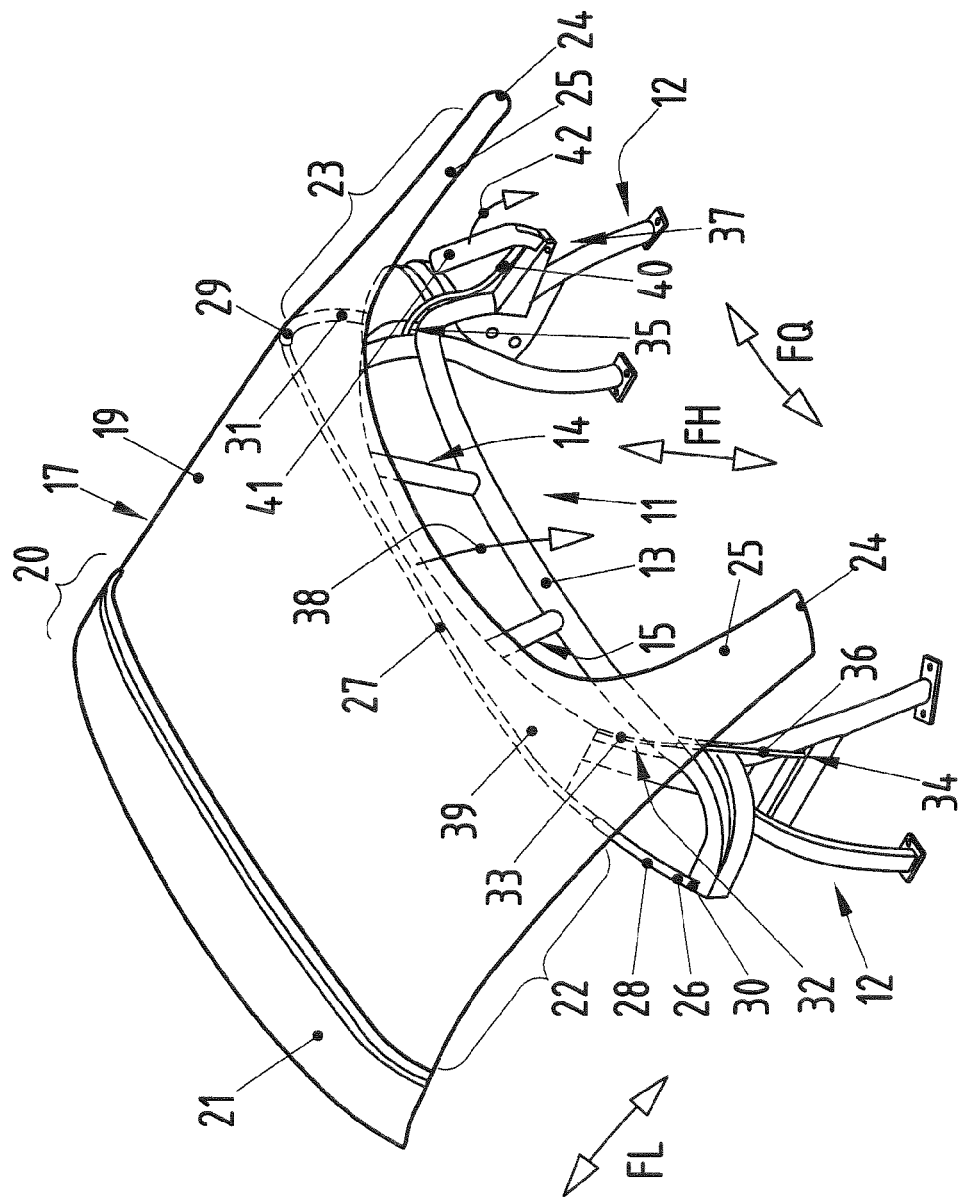
FIG. 2 shows the roof arrangement with a tensioning device and a roll bar of the convertible.

FIG. 1 shows part of convertible 1, which is a motor vehicle having an open body. The convertible 1 has a bodywork 2 that includes a rear side wall 3, side doors 4 and 5 and a front end 6 that has a windscreen frame 7. The windscreen frame 7 customarily has upwardly directed extensions of the A pillar and a lower cowl (not shown) located approximately in the belt line 8 and an upper cowl 9 that connects the two extensions of the A pillars to each other. The bodywork 2 also has a rear lid 10. A fixed roll bar arrangement 11 is shown in FIG. 2, and is fastened to the bodywork 2, for example to a floor assembly (not illustrated here). More particularly, the roll bar arrangement 11 has a lower structure 12 on each side for fastening the roll bar arrangement 11 to the bodywork 2. The two lower structures 12 are connected to each other via a crosspiece 13. Inverted U-shaped roll bars 14 and 15 are placed onto the crosspiece 13. The roll bars 14 and 15 and the upper cowl 9 and the upper cowl 9 protrude over the belt line 8. A vehicle interior 16 is open upward between the roll bar arrangement 11 and the upper cowl 9.

The vehicle interior 16 is spanned by a roof arrangement 17 which, in a mounted state MZ shown in FIG. 1, extends from the upper cowl 9 to a rear fastening device 18. The roof arrangement 17 comprises a flexible convertible-top cloth 19 that preferably is produced from fabric. The front of the roof arrangement 17 includes a transversely extending edge strip 20 and a shaping supporting element 21 is provided on the lower side of the front edge strip 20, as shown in FIG. 2. Locking and/or centring devices (not illustrated here) are attached to the supporting element 21 and can be used to fasten the supporting element 21 releasably to the upper cowl 9. The front edge strip 20 is adjoined by a central section 22 of the convertible-top cloth 19. The central section 22 merges into a rear end 23 and the fastening device 18 can fasten the rear end 24 of the rear section 23 on the rear lid 10. Thus, the convertible-top cloth 19 extends from the upper cowl 9 to the rear fastening device 18 on the rear lid and spans the passenger compartment 16 and the roll bar arrangement 11. In the illustrated embodiment, the rear section 23 of the convertible-top cloth 19 is approximately U-shaped, as seen in top view. Therefore lateral, strip-shaped fabric sections 25 extend to the end 24 and in the direction of the rear lid 10. A free region without a convertible-top fabric or cutout may be present between the fabric sections 25. Two fastening devices 18, to which the ends 24 can be fastened releasably, are provided laterally on the outside of the rear lid 10. However, the rear section 23 of the convertible-top cloth 19 could extend all over and hence only one end 24 would be present as a transversely extending edge strip. Accordingly, one or more rear end fastening devices 18 could be provided.

As is apparent from FIGS. 1 and 2, the roof arrangement 17 does not have a convertible-top linkage with which it could be moved automatically between the installation position MZ shown and an open position (not shown) in which the roof arrangement 17 is put away in the rear of the convertible 1. On the contrary, the roof arrangement 17 is equipped with the convertible-top cloth 19 that can be removed by hand and also mounted by hand on the convertible 1. The roof arrangement 17 has at least one supporting bow 26 in addition to the front supporting element 21 for the shaping support of the convertible-top cloth 19. The supporting bow 26 is at a distance behind the cowl 9, as seen in the longitudinal direction of the vehicle FL. In the installation position MZ shown, the supporting bow 26 defines an inverted U-shape connected to the convertible 1 and can be removed and mounted by hand. The supporting bow 26 has a central part 27 that extends in the transverse direction of the vehicle FQ, and side parts 28, 29 that are upright at outside lateral positions and are therefore oriented approximately in the vertical direction of the vehicle FH. Free ends 30 and 31 of the supporting bow 26 are on the side parts 28, 29 and are connected to the convertible 1 approximately level with the belt line 8. The supporting bow 26 can be of multi-part design. For example, the central part 27 and the two side parts 28 can be separate parts that are plugged together or otherwise connected and then can be separated again.

A tensioning device 32 is provided for the convertible-top cloth 19 and is used to build up a fabric tension in the convertible-top cloth 19 in the longitudinal direction of the vehicle FL so that the central section 22 and the front edge strip 20 of the convertible-top cloth 19 are tensioned with respect to the upper cowl 9. The tensioning device 32 comprises a tensioning means 33 that preferably is fastened to the inner side of the convertible-top cloth 19 and faces the vehicle interior 16. The tensioning means 33 has two outer ends 34 and 35. At least one end 34, 35 is held on the bodywork 2 or the roll bar arrangement 11 via a force accumulator 36 or length-compensating element. The other end 35 of the tensioning means 33 cooperates with a pulling and locking element 37 that enables the tensioning means 33 to be tensioned down in the direction of the arrow 38 and approximately in the vertical direction of the vehicle FH. The tensioning means 33 deflects the convertible-top cloth 19 down on the supporting bow 26 and hence the convertible-top cloth 19 is pulled down in the direction of the arrow 38 and is tensioned approximately in the vertical direction of the vehicle FH due to the fastening of the tensioning means 33 to the convertible-top cloth 19. The tensioning means 33 is between the cowl 9 and the rear fastening device 18, and preferably is behind the supporting bow 26. More particularly, the tensioning means 33 acts on the convertible-top cloth 19 in the transition region between the central section 22 and the rear section 23. The tensioning means 33 defines an arc from one side of the vehicle to the other. The tensioning means 33 can be a rigid arc, an arc that is entirely or partially flexible or an arc with flexible parts attached on the ends a central part. A fabric strip 39 with a channel or a pocket for receiving the tensioning means 33 can be provided to fasten the tensioning means 33 to the convertible-top cloth 19. The fabric strip 39 preferably is produced from the same material as the convertible-top cloth 19 and is fastened thereto.

The preferred tensioning means 33 is designed entirely as a flexible element, such as, a tensioning cable or the like, and is connected to the bodywork or the roll bar arrangement 11 via the force accumulator 36 and the pulling and locking device 37.

The force accumulator 36 may be a spring device and forms an extension of the tensioning means 33. The opposite end 35 of the tensioning means 33 has an element (not illustrated), such as, for example, a hook or an eye via which said tensioning means can be connected releasably to the pulling and locking device 37. The pulling and locking device 37 has a counterpart to the hook or the eye so that the end 35 of the tensioning means 33 can be connected thereto. The pulling and locking means 37 has a displaceable pulling element 40 that can be connected releasably to the end 35 of the tensioning means 33. The pulling element 40 is acted upon or moved by an adjusting element 41 that can introduce the desired pulling force into the tensioning means 33 so that the convertible-top cloth 19 is braced in the direction of the arrow 38. The adjusting element 41 in the FIG. 2 embodiment is a pivotably mounted tensioning lever, and is shown in the released position in FIG. 2 so that the tensioning means 33 is relaxed. The tensioning lever 41 can be moved down in the direction of the arrow 42 from the release position to the tensioned position (not shown) in which the tensioning means 33 is tensioned. The tensioning lever 41 can be locked in the tensioned position against inadvertent release. In alternate embodiments, the adjusting element 41 can be a winch, ratchet or the like that introduces a corresponding pulling force into the tensioning means 33.

The central part 27 of the supporting bow 26 is supported on the roll bars 14 and 15, and therefore the roll bars form an abutment for the supporting bow 26. Furthermore, the end 34 of the tensioning means 33 is fastened to the roll bar arrangement 11 via the force accumulator 36. The pulling and locking means 37 also can be fastened to the roll bar arrangement 11. Alternatively, the ends 34, 35 can be attached to the bodywork 2.

What is claimed is:

1. A roof arrangement for a convertible that has a cowl, a rear end fastening device and a passenger compartment between the cowl and the rear end fastening device, the roof arrangement comprising:
   a manually removable flexible convertible-top cloth stretched over the passenger compartment between the cowl and the rear end fastening device;
   a supporting bow extending in a transverse direction of the convertible at a distance behind the cowl, the supporting bow being beneath and supporting the convertible-top cloth; and
   a tensioning device located behind the supporting bow and in front of the rear end fastening device for keeping the convertible-top cloth tensioned in relation to the cowl, the tensioning device having a tensioning element for bracing the convertible-top cloth down approximately in a vertical direction of the vehicle and adjacent to the supporting bow when the roof arrangement is mounted on the convertible, the tensioning element being connectable to the convertible top cloth and fastened at opposite ends thereof to the convertible.

2. The roof arrangement of claim 1, wherein the tensioning device has a force accumulator for the tensioning element.

3. The roof arrangement of claim 1, characterized in that the tensioning device has a pulling and locking element for the tensioning element.

4. The roof arrangement of claim 1, wherein the tensioning element is a tensioning cable.

5. A convertible, comprising:
   a cowl;
   a rear end fastening device rearward of the cowl;
   a passenger compartment between the cowl and the rear end fastening device;
   a manually removable flexible convertible-top cloth stretched over the passenger compartment between the cowl and the rear end fastening device;
   a supporting bow extending in a transverse direction of the convertible at a distance behind the cowl, the supporting bow being beneath and supporting the convertible-top cloth;
   a fixed roll bar arrangement to which the supporting bow can be fastened; and
   a tensioning device for keeping the convertible-top cloth tensioned in relation to the cowl, the tensioning device having tensioning element for bracing the convertible-top cloth down approximately in a vertical direction of the vehicle and substantially adjacent to the supporting bow.

6. The convertible of claim 5, wherein at least one end of the tensioning element is fixable to the roll bar arrangement.

7. The convertible of claim 5, wherein the tensioning device is located behind the supporting bow and in front of the rear fastening device.

8. The convertible of claim 7, wherein the tensioning device has a flexible tensioning element that can be connected to the convertible-top cloth and fastened at opposite ends thereof to the convertible.

9. The convertible of claim 8, wherein the tensioning device has a force accumulator for the tensioning element.

10. The convertible of claim 8, characterized in that the tensioning device has a pulling and locking element for the tensioning element.

11. The convertible of claim 8, wherein the tensioning element is a tensioning cable.

* * * * *